US009185593B2

(12) United States Patent
Song

(10) Patent No.: US 9,185,593 B2
(45) Date of Patent: Nov. 10, 2015

(54) RESPONDING TO AN INTERACTIVE MULTICAST MESSAGE WITHIN A WIRELESS COMMUNICATION SYSTEM

(71) Applicant: QUALCOMM Incorporated, San Diego, CA (US)

(72) Inventor: Bongyong Song, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 14/062,399

(22) Filed: Oct. 24, 2013

(65) Prior Publication Data

US 2014/0050088 A1 Feb. 20, 2014

Related U.S. Application Data

(62) Division of application No. 12/212,390, filed on Sep. 17, 2008, now Pat. No. 8,625,475.

(60) Provisional application No. 60/974,796, filed on Sep. 24, 2007, provisional application No. 60/974,831, filed on Sep. 24, 2007.

(51) Int. Cl.
*H04W 28/02* (2009.01)
*H04L 12/801* (2013.01)
(Continued)

(52) U.S. Cl.
CPC ............ *H04W 28/02* (2013.01); *H04L 12/1872* (2013.01); *H04L 47/10* (2013.01); *H04L 47/12* (2013.01); *H04L 47/14* (2013.01); *H04L 47/15* (2013.01); *H04L 47/32* (2013.01); *H04L 47/323* (2013.01); *H04W 4/06* (2013.01); *H04W 4/10* (2013.01); *H04W 76/002* (2013.01); *H04L 12/189* (2013.01); *H04W 72/005* (2013.01)

(58) Field of Classification Search
None
See application file for complete search history.

(56) References Cited

U.S. PATENT DOCUMENTS 5,589,872 A 12/1996 Martinez
6,275,500 B1 * 8/2001 Callaway et al. ............. 370/449
(Continued)

FOREIGN PATENT DOCUMENTS

CN 1023617 C 1/1994
CN 1253641 A 5/2000
(Continued)

OTHER PUBLICATIONS

3GPP2, "CDMA2000 High Rate Broadcast-Multicast Packet Data Air Interface Specification," Feb. 14, 2006, Version 1.0, C.S0054-A, pp. 1-169.
(Continued)

*Primary Examiner* — Warner Wong
(74) *Attorney, Agent, or Firm* — Michael F. Taveira

(57) ABSTRACT

Wireless communication systems and methods of scheduling access terminal responses to an interactive multicast message are provided. A radio access network (RAN) generates an access control message (ACM), the ACM indicating feedback instructions for a plurality of access terminals (ATs) belonging to a given multicast group. The feedback instructions of the ACM designate a temporary manner in which the plurality of access terminals are to respond to an interactive multicast message. The target ATs receive the interactive multicast message as well as the ACM. The target ATs, or multicast group members, respond to the interactive multicast message based on the feedback instructions for the plurality of access terminals indicated by the ACM.

24 Claims, 11 Drawing Sheets

(51) Int. Cl.
*H04L 12/823* (2013.01)
*H04W 76/00* (2009.01)
*H04W 4/06* (2009.01)
*H04W 4/10* (2009.01)
*H04L 12/18* (2006.01)
*H04W 72/00* (2009.01)

(56) References Cited

U.S. PATENT DOCUMENTS

| | | | |
|---|---|---|---|
| 6,839,565 B2 | 1/2005 | Sarkkinen et al. | |
| 6,862,264 B1 | 3/2005 | Moura et al. | |
| 7,013,157 B1 | 3/2006 | Norman et al. | |
| 7,185,099 B1 | 2/2007 | Block | |
| 7,567,536 B2 | 7/2009 | Czaja et al. | |
| 2002/0037736 A1* | 3/2002 | Kawaguchi et al. | 455/518 |
| 2003/0157949 A1 | 8/2003 | Sarkkinen et al. | |
| 2003/0186176 A1* | 10/2003 | Arakawa et al. | 430/350 |
| 2005/0111394 A1 | 5/2005 | Jung et al. | |
| 2005/0281208 A1 | 12/2005 | Dorenbosch et al. | |
| 2006/0034241 A1 | 2/2006 | Czaja et al. | |
| 2006/0046762 A1 | 3/2006 | Yoon et al. | |
| 2006/0050659 A1* | 3/2006 | Corson et al. | 370/310 |
| 2006/0098616 A1 | 5/2006 | Kish et al. | |
| 2006/0109859 A1 | 5/2006 | Acharya et al. | |
| 2006/0253601 A1 | 11/2006 | Vedantham et al. | |
| 2006/0258369 A1 | 11/2006 | Burroughs et al. | |
| 2007/0049314 A1 | 3/2007 | Balachandran et al. | |
| 2007/0076739 A1* | 4/2007 | Manjeshwar et al. | 370/432 |
| 2007/0086382 A1 | 4/2007 | Narayanan et al. | |
| 2007/0192832 A1 | 8/2007 | Qi et al. | |
| 2007/0195769 A1 | 8/2007 | Lin | |
| 2007/0248063 A1 | 10/2007 | Habetha | |
| 2007/0280153 A1 | 12/2007 | Sinha | |
| 2007/0281722 A1 | 12/2007 | Gao | |
| 2007/0281726 A1 | 12/2007 | Rey et al. | |
| 2008/0123578 A1 | 5/2008 | Golitschek Edler Von Elbwart et al. | |
| 2008/0130622 A1 | 6/2008 | Hiertz et al. | |
| 2008/0181163 A1 | 7/2008 | Ye et al. | |
| 2008/0310324 A1 | 12/2008 | Chaponniere | |
| 2009/0080355 A1 | 3/2009 | Song | |
| 2009/0080356 A1 | 3/2009 | Song et al. | |
| 2009/0080359 A1 | 3/2009 | Song et al. | |
| 2009/0080363 A1 | 3/2009 | Song et al. | |
| 2009/0213775 A1* | 8/2009 | Rey et al. | 370/312 |
| 2010/0017455 A1* | 1/2010 | Svendsen et al. | 709/202 |
| 2010/0226263 A1 | 9/2010 | Chun et al. | |
| 2011/0182225 A1 | 7/2011 | Song et al. | |
| 2011/0274046 A1 | 11/2011 | Rune et al. | |
| 2013/0010775 A1 | 1/2013 | Kish et al. | |
| 2013/0121235 A1 | 5/2013 | Song et al. | |
| 2014/0050142 A1 | 2/2014 | Song et al. | |

FOREIGN PATENT DOCUMENTS

| | | |
|---|---|---|
| CN | 1476259 | 2/2004 |
| CN | 101552682 A | 10/2009 |
| EP | 0731578 A2 | 9/1996 |
| EP | 1624610 A1 | 2/2006 |
| EP | 1770903 A1 | 4/2007 |
| JP | 04023525 | 1/1992 |
| JP | H05103033 A | 4/1993 |
| JP | H08317454 A | 11/1996 |
| JP | 2000115051 A | 4/2000 |
| JP | 2003051827 A | 2/2003 |
| JP | 2003511925 A | 3/2003 |
| JP | 2008509582 A | 3/2008 |
| JP | 2008522510 A | 6/2008 |
| JP | 2009517925 A | 4/2009 |
| KR | 100890060 B1 | 3/2009 |
| RU | 2259016 | 8/2005 |
| WO | 2006012946 A2 | 2/2006 |
| WO | 2006020970 | 2/2006 |
| WO | 2006058345 A1 | 6/2006 |
| WO | WO-2007102057 | 9/2007 |
| WO | 2009042695 A1 | 4/2009 |

OTHER PUBLICATIONS

European Search Report—EP12162165—Search Authority—Munich—Apr. 23, 2012.
European Search Report—EP13170123—Search Authority—Munich—Jul. 1, 2013.
International Preliminary Report on Patentability, PCT/US2008/076967, International Preliminary Examining Authority, European Patent Office, Feb. 5, 2010.
International Preliminary Report on Patentability, PCT/US2008/076990, International Preliminary Examining Authority, European Patent Office, Feb. 12, 2010.
International Search Report and Written Opinion—PCT/US2008/076967, International Search Authority, European Patent Office, Apr. 2, 2009.
International Search Report and Written Opinion—PCT/US2011/022457—ISA/EPO—Apr. 19, 2011.
International Search Report, PCT/US2008/076990, International Searching Authority, European Patent Office, Jul. 17, 2009.
Written Opinion, PCT/US2008/076990, International Searching Authority, European Patent Office, Jul. 17, 2009.

* cited by examiner

"ACM generation"

"ACM response"

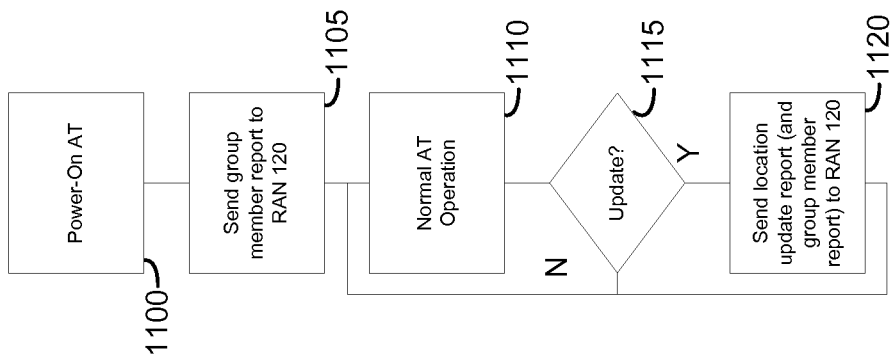

RESPONDING TO AN INTERACTIVE MULTICAST MESSAGE WITHIN A WIRELESS COMMUNICATION SYSTEM

CLAIM OF PRIORITY UNDER 35 U.S.C. §119

The present application for patent is a divisional of U.S. application Ser. No. 12/212,390 entitled "RESPONDING TO AN INTERACTIVE MULTICAST MESSAGE WITHIN A WIRELESS COMMUNICATION SYSTEM" filed Sep. 17, 2008, which in turn claims priority to Provisional Application No. 60/974,796 entitled "METHODS OF RESPONDING TO AN INTERACTIVE MULTICAST MESSAGE WITHIN A WIRELESS COMMUNICATION SYSTEM" filed Sep. 24, 2007, and to Provisional Application No. 60/974,831 entitled "METHODS OF MANAGING ACKNOWLEDGMENT TRANSMISSIONS FROM MULTICAST GROUP MEMBERS OF A MULTICAST GROUP WITHIN A WIRELESS COMMUNICATIONS NETWORK" filed Sep. 24, 2007, each of which is assigned to the assignee hereof and is hereby expressly incorporated by reference herein in its entirety.

BACKGROUND OF THE INVENTION

1. Field of the Invention

The invention relates to communications in a wireless telecommunication system and, more particularly to methods of responding to an interactive multicast message within the wireless communication system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communication network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a given cell, etc.), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

Embodiments of the present invention are directed to wireless communication systems and methods of scheduling access terminal responses to an interactive multicast message are provided. A radio access network (RAN) generates an access control message (ACM), the ACM indicating feedback instructions for a plurality of access terminals (ATs) belonging to a given multicast group. The feedback instructions of the ACM designate a temporary manner in which the plurality of access terminals are to respond to an interactive multicast message. The target ATs receive the interactive multicast message as well as the ACM. The target ATs, or multicast group members, respond to the interactive multicast message based on the feedback instructions for the plurality of access terminals indicated by the ACM.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which:

FIG. 11 illustrates a multicast group member reporting and location updating process according to an embodiment of the present invention.

DETAILED DESCRIPTION

Figure 1:
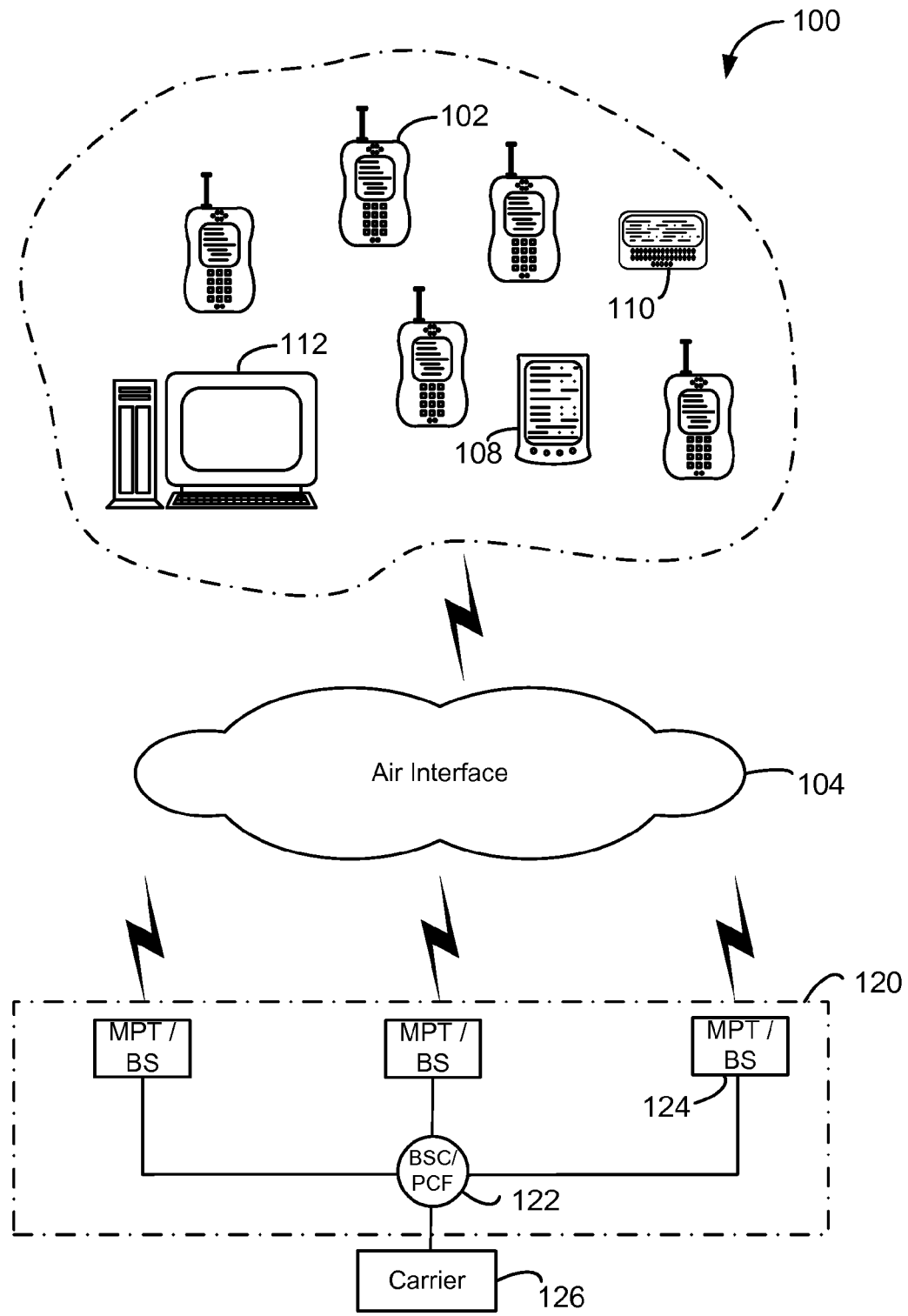
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
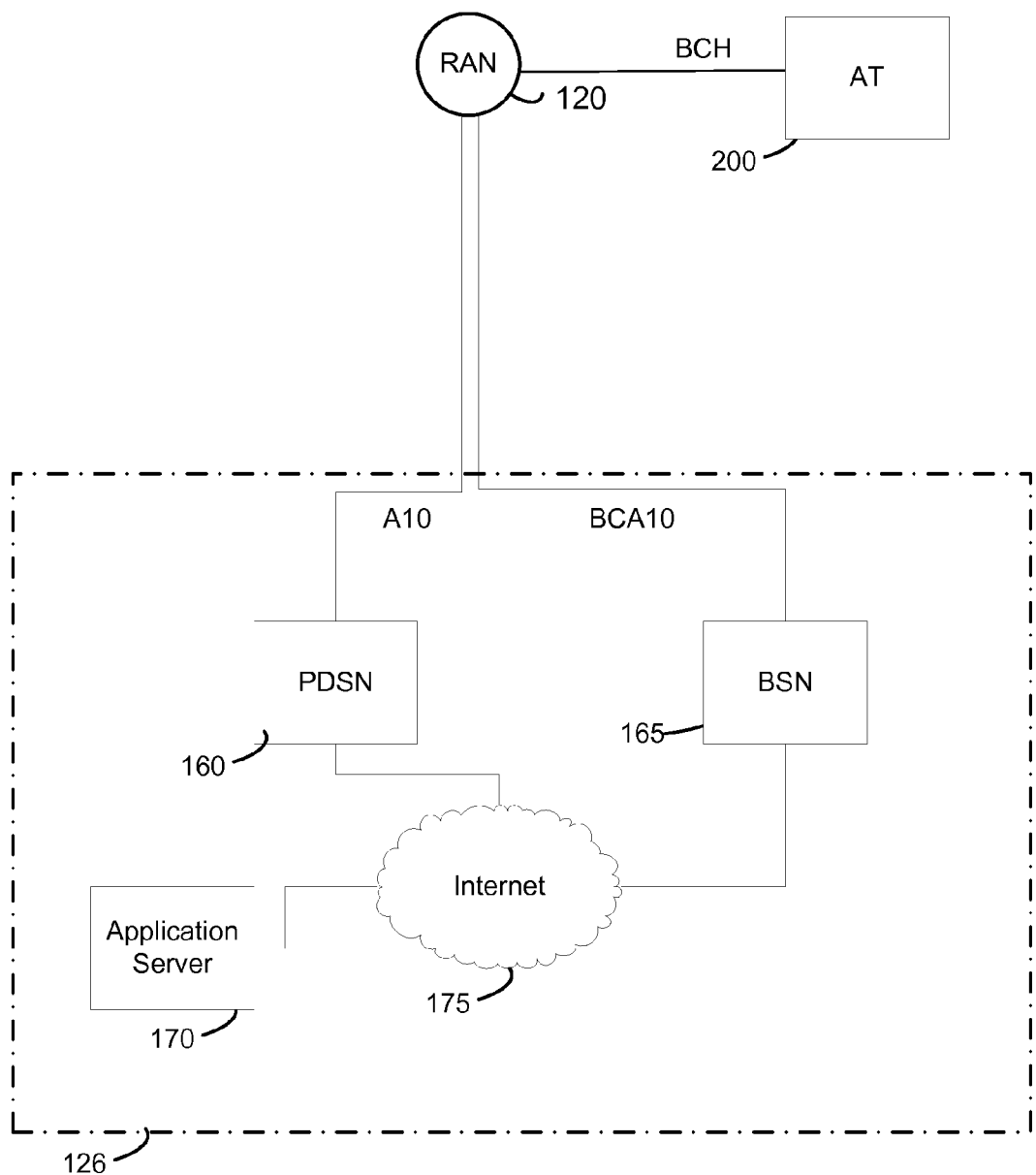
FIG. 2 illustrates the carrier network according to an embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 3:
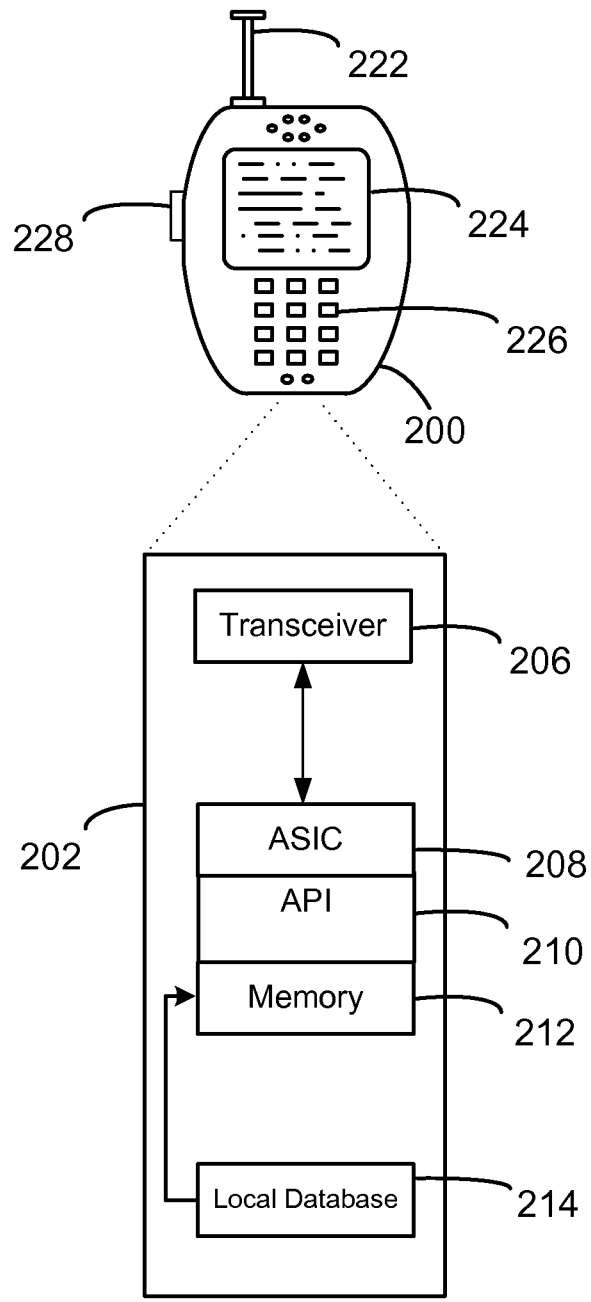
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API') 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

As discussed in the Background section, multicast messaging may be performed in a number of ways. In order to better understand embodiments of the present invention, a conventional multicast messaging process will be described with respect to FIGS. 4 and 5, respectively. Then, a multicast messaging process according to an embodiment of the present invention will be described in greater detail.

Figure 4:
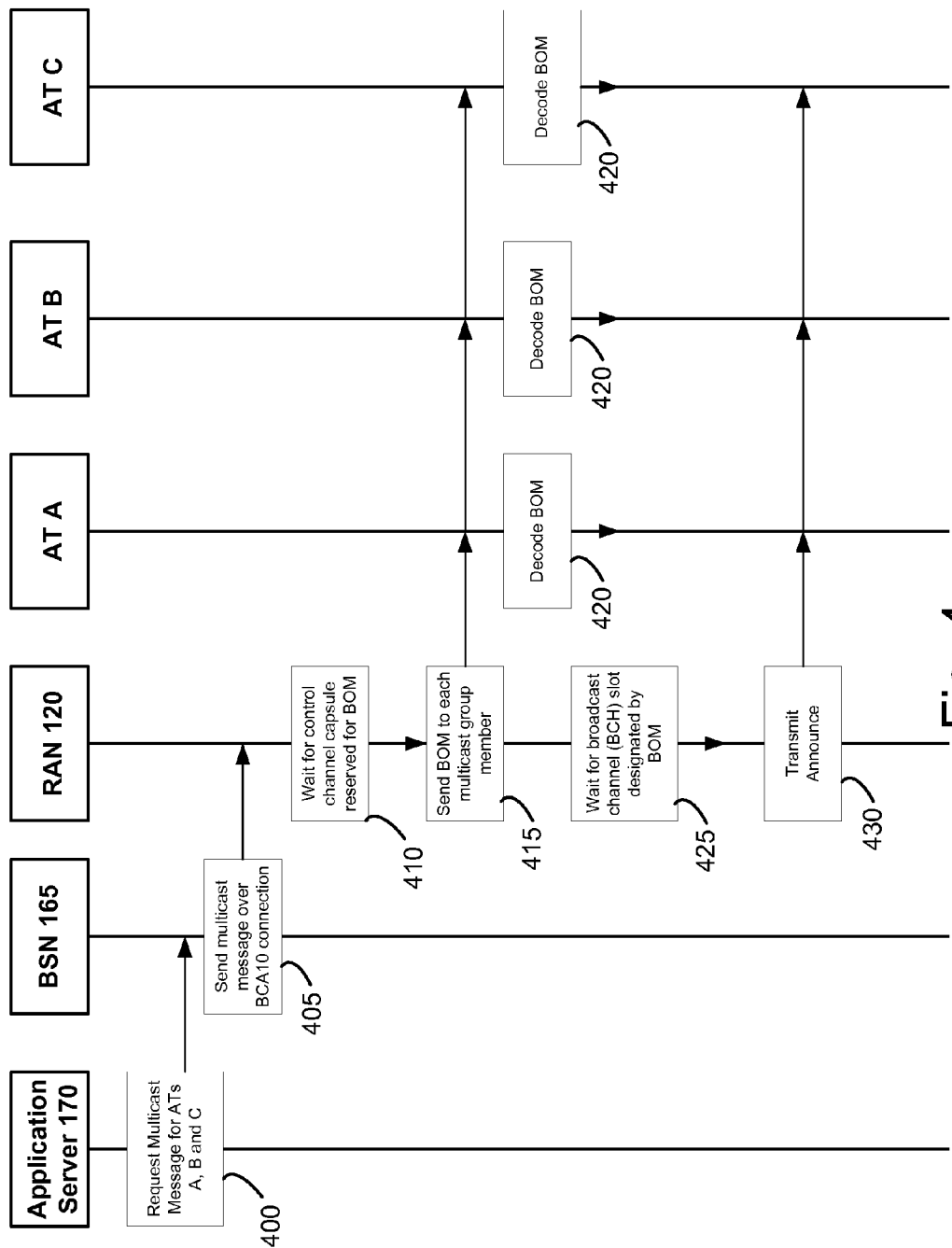
FIG. 4 illustrates a conventional multicast messaging process using a broadcast multicast server (BCMCS) framework.

FIG. 4 illustrates a conventional multicast messaging process using a broadcast multicast server (BCMCS) framework. The multicast messaging process of FIG. 4 is described below as performed within the wireless system 100 of FIGS. 1 and 2. Referring to FIG. 4, in 400, the application server (or other initiator) requests a multicast message be sent to a multicast group including ATs (e.g., A, B and C). The multicast message from 400 is routed to the BSN 165. In 405, the BSN 165 forwards the multicast message along with the associated multicast group including the target destinations or ATs for the multicast message over the BCA10 connection to the RAN 120. For example, the multicast message is first forwarded to the BSC/PCF 122, and the BSN/PCF 122 analyzes the multicast group members for the multicast message and forwards the multicast message to each MPT/BS 124 serving one or more multicast group members.

After receiving the forwarded multicast message, the RAN 120 waits for a next available control channel capsule in 410. The control channel referred to herein is a downlink control channel which is assigned a different frequency, coding and/or bandwidth than the broadcast channel (BCH). Generally, less bandwidth is allocated to the control channel, which is conventionally intended to include control messaging only, while more bandwidth is allocated to the broadcast channel (BCH) which is conventionally intended to include data.

Figure 5:
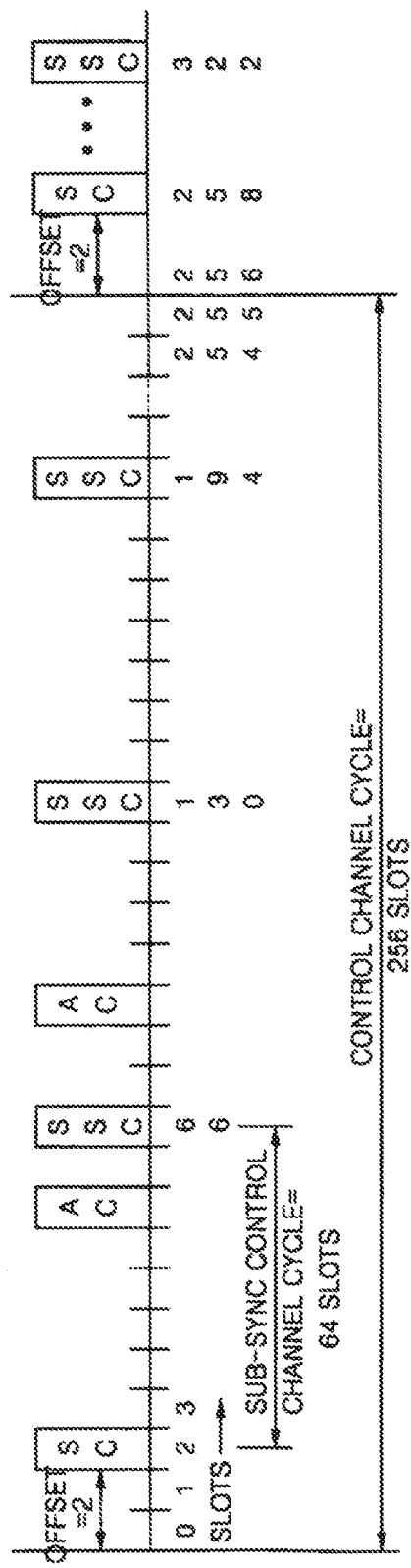
FIG. 5 illustrates a conventional cycle of a downlink control channel.

Referring to FIG. 5, each control channel cycle includes a total of 256 slots. Each control channel cycle includes a synchronous control channel capsule (SC), an asynchronous control channel capsule (AC), and a number of sub-synchronous control channels (SSCs). One SC is regularly or periodically transmitted at a given timeslot for each control channel cycle having a period of 256 slots, whereas the AC is transmitted at "random", or at non-synchronous timeslots, within the control channel cycle. The SC is first transmitted at a timeslot corresponding to "T mod 256=Offset", and then retransmitted at a timeslot corresponding to "T mod 4=Offset", where T denotes a system time and an Offset denotes a time value delayed from a fixed time, which are included in the control channel header. Each SC may include a plurality of control channel MAC layer packets, whereas each AC includes only one control channel MAC layer packet. As each MPT/BS 124 periodically transmits one or more control channel MAC layer packets, interference (e.g., inter-cell interference) may occur if each MPT/BS 124 transmits at the same time. Accordingly, a different offset is applied to the SC for each MPT/BS 124 to avoid collisions. The MPT/BS may transmit as many as three SSC capsules within one control channel period or 256 slot cycle. Each SSC typically transmits only one control channel MAC layer packet. Assuming an offset value of 2, the SSCs are transmitted at time slots 66, 130 and 194. Control channel capsules (e.g., SCs, ACs, SSCs, etc.) are generally well-known in the art within BCMCS systems, and as such a further description thereof has been omitted for the sake of brevity.

Returning back to FIG. 4, in 410, the RAN 120 may wait for either a synchronous control channel capsule (SC) (e.g., timeslot 2 in a next control channel cycle assuming an offset of 2) or, alternatively, a sub-synchronous control channel capsule (SSC) (e.g., one of timeslots 66, 130, 194 of the control channel cycle assuming an offset of 2), that is periodically reserved for the BOM. For example, one particular control channel capsule within each control channel cycle may be reserved for a particular BOM. Since other applications may be attempting to access the control channel and other messages may be scheduled a delay of multiple cycles may be incurred.

In 415, after waiting for the next available SC or SSC, the RAN 120 transmits a broadcast overhead message (BOM) over the air interface to one or more multicast group members (e.g., ATs A, B, C). The BOM is a forward link control message defined by EV-DO standards. The BOM is used to notify each multicast group member of the BCMCS flows which are currently being carried in a sector. The BOM also provides Interlaced Multiplexed Pair (IM-Pair) information which is information regarding the forward link physical layer timeslots that should be decoded to receive the desired packet flows, and information on the number of physical layer slots per broadcast physical layer packet and physical layer rate used to transmit the flow. In 420, the RAN 120 waits a predetermined number of slots (e.g., 8 to 16 slots) for the BOM to be decoded at the target ATs. After the delay 420, the RAN 120 waits for the BCH slot designated by the decoded BOM, 425. This creates another delay, which may be further exacerbated based on the traffic on the broadcast channel. In 430, the RAN 120 transmits the announce message to each multicast group member or target AT which it is serving over the broadcast channel (BCH) on the designated BCH slot.

As described above with respect to FIG. 4, conventional BCMCS multicast messaging typically requires each target AT or multicast group member to decode a broadcast overhead message (BOM) before a multicast message is transmitted over a broadcast channel (BCH) to the respective members of the multicast group. This creates delays both for the scheduling of the BOM, delays for the decoding, and potential subsequent delays for the scheduling the announce message.

Figure 6:
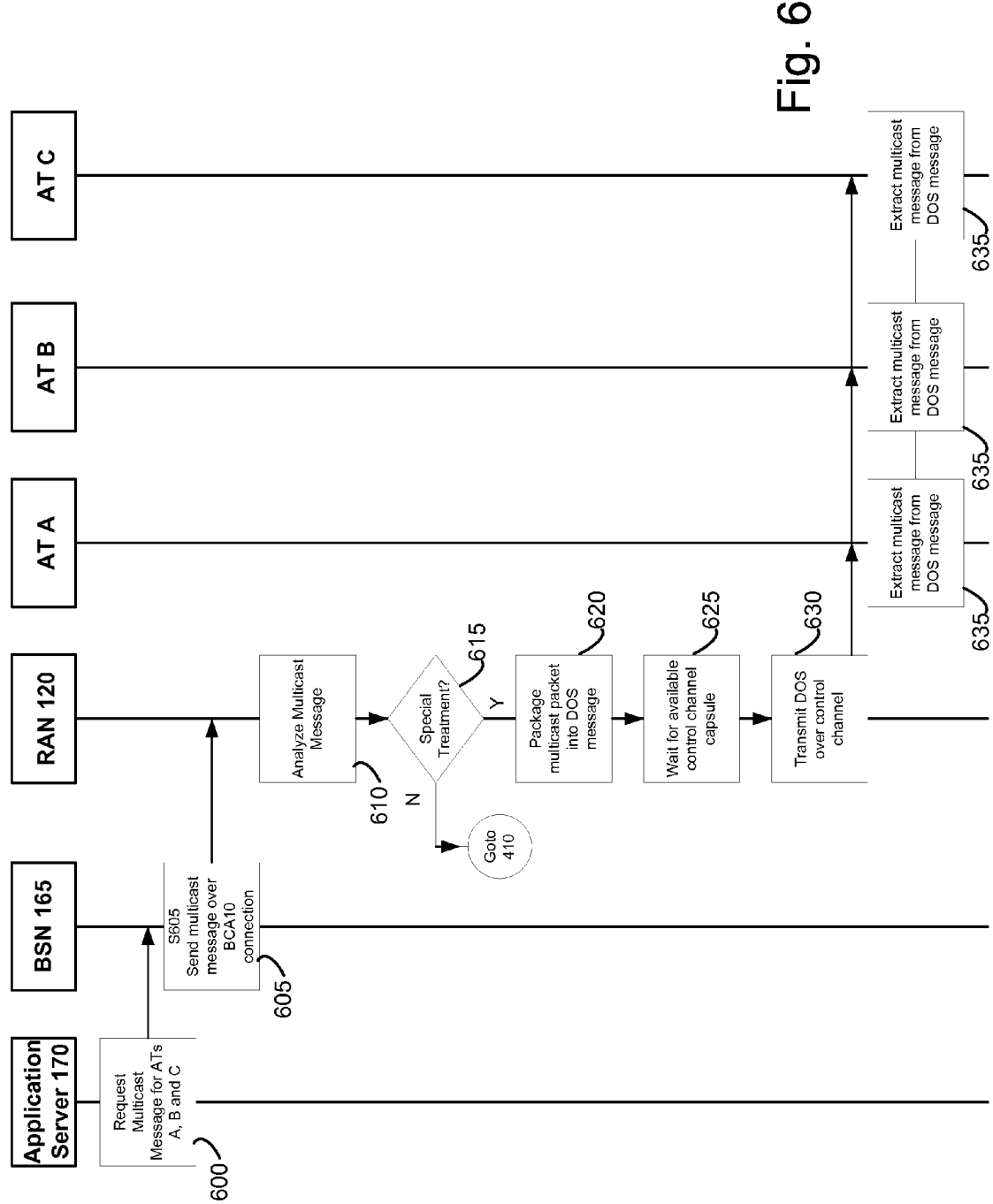
FIG. 6 illustrates a multicast messaging process according to an embodiment of the present invention.

In the embodiment of FIG. 6, in 600, the application server 170 requests a multicast message be sent to a multicast group including ATs A, B and C. The multicast message from 600 is routed to the BSN 165. In 605, the BSN 165 forwards the multicast message along with the associated multicast group including the target destinations or ATs for the multicast message over the BCA10 connection to the RAN 120. For example, the BSN 165 may forward the multicast message to the BSC/PCF 122, which may analyze the multicast group members associated with the multicast message and forwards the multicast message to each MPT/BS 124 serving one or more multicast group members.

After receiving the forwarded multicast messages, the RAN 120 analyzes the received multicast message in 610. Based on the analysis in 610, the RAN 120 determines whether to apply special handling instructions or treatment to the multicast message in 615. For example, the analyzing in 610 may evaluate the internet protocol (IP) header of the multicast message. If a "flag" is determined to be present within the IP header, for example, the Difsery Code Point (DSCP) value of the IP header, the flag may be interpreted as a trigger which requests special handling for the multicast message. Alternatively, the flag may be provided within the well-known BCA10 identifier (ID) or BCMCS flow ID (e.g., separate from the IP header). For example, before the multicast session, the application server 170 may select one or more BCMCS flow IDs to be "reserved" or associated with special handling (e.g., multicast sessions reserved for emergency communications, etc.). The application server 170 may then share the selected or reserved BCMCS flow IDs with the RAN 120. Accordingly, thereafter, during a multicast session, the RAN 120 may check, in 610, whether the received multicast message corresponds to one of the reserved BCMCS flow IDs, and if so, determines to apply special handling for the received multicast message in 615.

In another alternative example, the flag may be provided via both the IP header and BCA10 ID. Generally, a flag within the IP header (e.g., a multicast IP address and/or port number) may be recognized/decoded by the BSC portion of the BSC/PCF 122 of the RAN 120, and a flag within the DSCP may be recognized/decoded by the PCF portion of the BSC/PCF 12 of the RAN 120. BCA10 identifiers and DSCP values are well-known in the art, and will not be described further for the sake of brevity.

For example, the "flag" may be inserted into the multicast message (e.g., via the IP header, the BCMCS flow ID or BCA10 ID, etc.) at any higher-level position within the network architecture relative to the RAN 120. The flag may be inserted into the IP header by the application server 170, the BSN 165, etc. In another example, the flag may be used to designate "higher priority" multicast messages. For example, multicast messages associated with emergency alerts may be "flagged", whereas multicast messages associated with product advertisements may not necessarily be "flagged".

In 615, if the RAN 120 determines not to apply special handling to the multicast message, the process advances to block 410 of FIG. 4 and conventional BCMCS multicast message protocols can be used to transmit the multicast message to the multicast message group. Otherwise, if the RAN 120 determines that special handling has been requested for the multicast message in 615, the process advances to 620.

In 620, the RAN 120 generates a data over signaling (DOS) message which includes the multicast message. DOS messages are well-known in the art within EV-DO protocols. DOS messages are defined by EV-DO standard as a unicast message, and are not associated with multicast messaging in the EV-DO standard. However, embodiments of the invention generate a DOS message including the multicast message. The DOS message may be reconfigured to support multicast messaging protocols, as will now be described.

The CDMA2000 1x EV-DO defines, an access terminal identifier (ATI) for identifying an access terminal, a broadcast ATI (BATI), a multicast ATI (MATI), a unicast ATI (UATI) and a random ATI (RATI). The BATI is defined as "00", the MATI is defined as "01", the UATI is defined as "10", and the RATI is defined as "11". The three ATI types excluding the BATI have a 32-bit field for representing an ATI. The UATI is used in a 1:1 call processing procedure.

As discussed above, DOS messages are defined by EV-DO standards as being associated with unicast messaging, and not multicast messaging. However, the DOS message generated in 620 is addressed to the multicast access terminal identifier (MATI), where the MATI is set to the BCMCSFlowID associated with the multicast message. The BCMCSFlowID allows the ATs to identify the appropriate stream on the broadcast channel for the group call. Generally, the BCMCSFlowID is known at each respective AT which is monitoring a particular BCMCS flow (e.g., the BCMCSFlowID may be designated by the BOM, etc.). Accordingly, as will be described in greater detail below, by tagging or addressing the DOS message of 620 to the MATI, the target ATs receiving the DOS message may interpret the DOS message as a multicast message associated with a particular BCMCS flow, and directly receive the needed information to start the group call. Alternatively, however, it will be appreciated that other embodiments need not be limited to setting the MATI to the BCMCSFlowID to distinguish the DOS as a multicast message. For example, the MATI may be set to any value which multicast group members or ATs may interpret as identifying the MATI to be a multicast message for a particular multicast group.

In 625, the RAN 120 waits for a next available control channel capsule on the control channel. In 630, the RAN 120 transmits the DOS message to the multicast group members over the control channel within the next available control channel capsule. As discussed above, each synchronous channel (SC) (e.g., or alternatively, each sub-synchronous channel) of the control channel capsule may include a plurality of MAC layer packets. Accordingly, in an example, the DOS message may be included in the first MAC layer packet of the given control channel capsule.

In 635, each target AT receives the DOS message transmitted in 630 over the control channel. Because the DOS message is addressed to the MATI, each target AT determines the DOS message to include the associated multicast message (e.g., as opposed to a unicast message). It will be appreciated that a DOS message addressed to a MATI would likely be interpreted as an error in a conventional handset or AT. In this embodiment, however, each target AT may be configured to recognize a control message addressed to the MATI (e.g., or otherwise identified as a multicast message) as a multicast message, such that the AT configured in accordance with this embodiment extracts the multicast message from the received DOS message in 635. The respective target ATs may acknowledge receipt of the multicast message included within the DOS message subsequent to a successful receipt or "extracting" of the multicast message. In another aspect of the invention, the RAN 120 may first confirm that one or more given target ATs is capable of interpreting, for example, DOS messages using the MATI as multicast messages, in order to ensure that the DOS multicast messages are interpreted correctly by receiving ATs. In an example, each AT receiving the DOS message may decode/extract the multicast message in 635, irrespective of whether the AT is actually one of the intended recipients of the multicast message. In another example, only "target" ATs, or ATs interested in the multicast session, may decode/extract the multicast message from the DOS message in 635.

As will be appreciated from the forgoing description of the exemplary multicast messaging process of FIG. 6, the delays and potential loss of data associated with sending a BOM to the multicast group members, waiting for BOM decoding, and sending an announce message, may be avoided for DOS multicast messages by allocating higher-priority status via an IP header flag and transmitting the higher-priority multicast messages via the control channel.

Further, it will be appreciated that the processes of FIG. 6, which have been described as being performed at the RAN 120 and/or MPT/BS 124 may be performed at one or more RANs and/or MPT/BSs at the same time in other embodiments of the invention, and the description of FIG. 6 has been directed to a single-RAN and MPT/BS implementation for the sake of convenience of description only. In another example, if multicast group members are dispersed among different MPT/BS 124's, procedures 610 through 635 may be performed among the different MPT/BS 124's independently.

Further, while the embodiment of FIG. 6 is directed to a DOS message in 1xEVDO being set to a MATI address or multicast bit signature as opposed to a UATI address or unicast bit signature, it will be appreciated that any control channel message adapted to conform to a MATI-type message may alternatively be used to transfer a multicast message on the control channel.

The embodiment of FIG. 6 has generally been directed to multicast messaging in general, and not specifically to "interactive" multicast messaging. An interactive multicast message is a multicast message that requests a response, or feedback, from each or a portion of target ATs or multicast group members within the multicast group. For example, an interactive multicast message may correspond to a push-to-talk (PTT) message where a mobile subscriber selecting PTT desires to establish communication with one or more multicast group members within a given multicast group.

In order to better understand the present invention, a conventional manner in which ATs respond to interactive multicast messages is described below, followed by interactive multicast message response protocols according to embodiments of the present invention.

Figure 7:
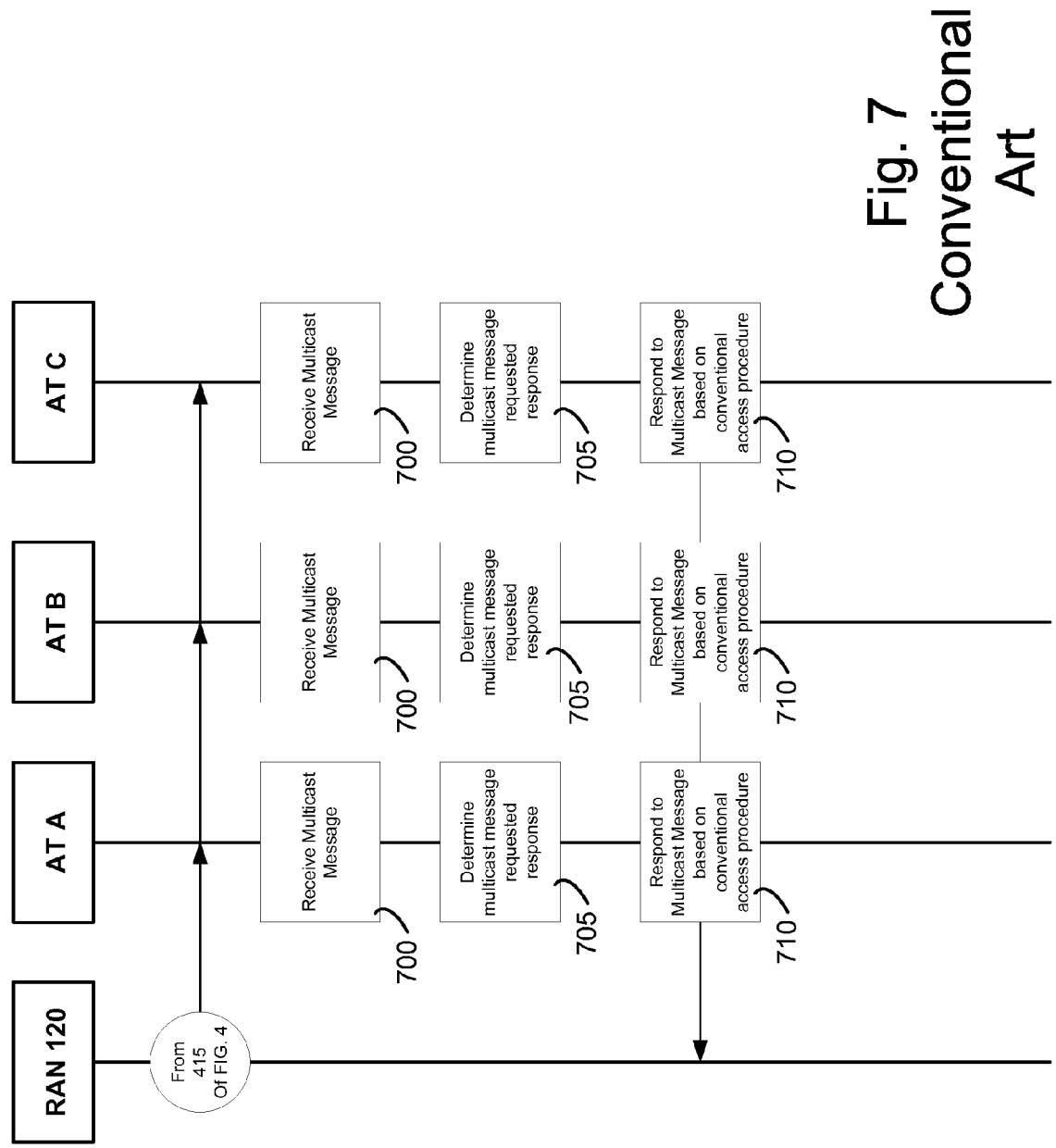
FIG. 7 illustrates a conventional access terminal response to an interactive multicast message.

FIG. 7 illustrates a conventional access terminal response to an interactive multicast message. In particular, FIG. 7 illustrates a continuation of the process of FIG. 4 as described above. Accordingly, it is assumed that the process of FIG. 4 executes as described above, and that the multicast message transmitted to each target AT A, B and C over the broadcast channel (BCH) is an interactive multicast message. Under these assumptions, the interactive multicast message is received by ATs A, B and C in 700, respectively. In 705, each of ATs A, B and C determine that the received multicast message is interactive (e.g., based on an evaluation of data included therein). Next, in 710, each target AT A, B and C responds to the interactive multicast message by sending a message on the reverse link to the RAN 120. In particular, the ATs A, B and C using conventional techniques may each respond according to the access procedure specified by the conventional, broadcasted AccessParameters message to the interactive multicast message on a reverse link or uplink access channel (e.g., assuming the AT does not miss or drop the interactive multicast message). The parameters in the AccessParameters message are tailored to the predominant use cases (e.g., call origination and page response), and allow the ATs to transmit responses to the interactive multicast message with a relatively small amount of delay via an "APersistence function", such that there may be many simultaneous or concurrent responses from different ATs. The AccessParameters message and the APersistence function will be described in greater detail below.

Accordingly, it will be appreciated that as the number of target ATs increases, the number of target ATs transmitting to the RAN 120 on the reverse link access channel at the same time will increase, thereby increasing interference and reducing each respective ATs chances of successfully reaching the RAN 120.

As discussed above, concurrent responses on the reverse link access channel by multiple ATs may degrade system performance. FIGS. 8 through 11, which will now be described, are directed to a set of interactive multicast message response protocols for increasing system performance through a more efficient allocation of the access channel for interactive multicast message responses.

Figure 8:
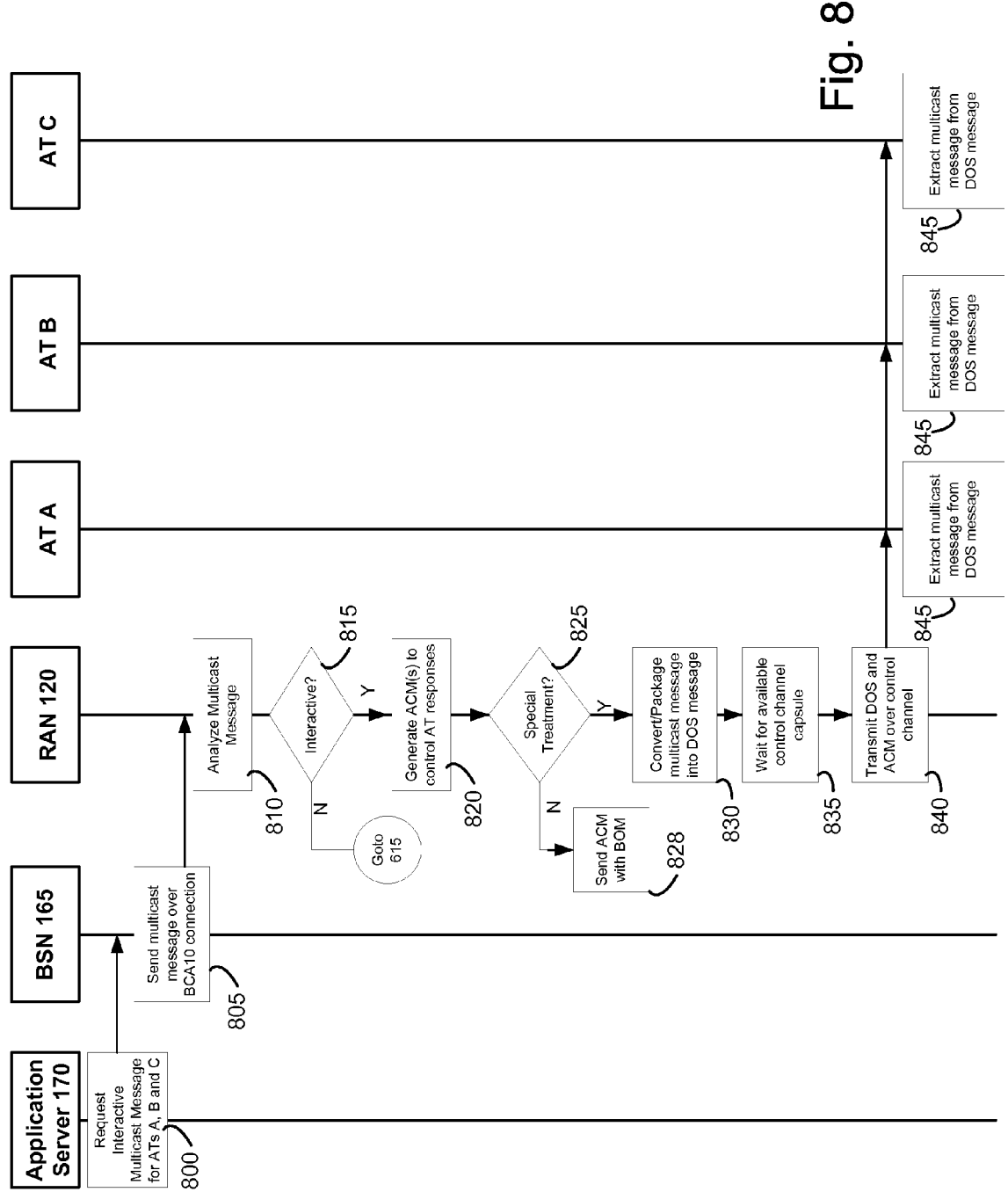
FIG. 8 illustrates an interactive multicast messaging generation and transmission process according to an embodiment of the present invention.

FIG. 8 illustrates an interactive multicast messaging generation and transmission process according to an embodiment of the present invention. In the embodiment of FIG. 8, in 800, the application server 170 requests that an interactive multicast message be sent to a multicast group including ATs A, B and C. For example, while not shown in FIG. 8, the interactive multicast message may be generated in response to a push-to-talk (PTT) message received from a given AT for a given multicast group. The interactive multicast message from 800 is routed to the BSN 165. In 605, the BSN 165 forwards the multicast message along with the associated multicast group including the target destinations or ATs for the interactive multicast message over the BCA10 connection to the RAN 120. For example, the BSN 165 may forward the multicast message to the BSC/PCF 122, which may analyze the multicast group members associated with the multicast message and forwards the multicast message to each MPT/BS 124 serving one or more multicast group members.

After receiving the forwarded multicast message, the RAN 120 analyzes the received multicast message in 810. Based on the analysis in 810, the RAN 120 determines whether the received multicast message is interactive in 815 (e.g., whether the multicast message requests a response from one or more of its multicast group members). If the RAN 120 determines that the received multicast message is not interactive in 815, the process advances to 615 of FIG. 6 where non-interactive multicast message protocols can be used to transfer the multicast message to the multicast group members. Otherwise, if the RAN 120 determines that the received multicast message is interactive in 815, the process advances to 820.

In 820, the RAN 120 generates one or more access control messages (ACMs) for scheduling AT responses to the interactive multicast message. An example of ACM generation as in 820 will now be described in more detail with reference to FIG. 9.

Figure 9:
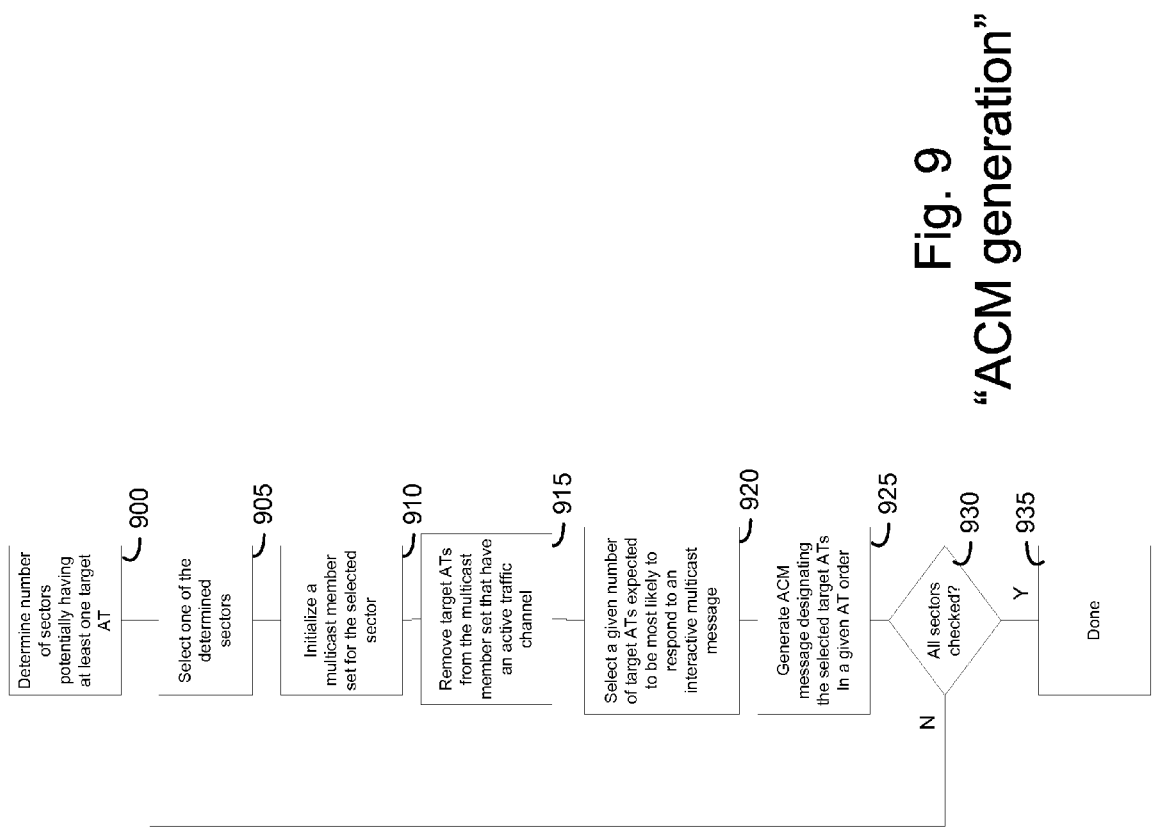
FIG. 9 illustrates an ACM generating process according to an embodiment of the present invention.

FIG. 9 illustrates the ACM generating process 820 according to an embodiment of the present invention. Referring to FIG. 9, in 900, the RAN 120 determines the number of sectors having at least one target AT or multicast group member to which the interactive multicast message is addressed within the wireless system 100. For example, the RAN 120 may perform the determining 900 based on group member reports and location update reports received from multicast group members, as will be described in greater detail below with respect to FIG. 11. Generally, the group member reports are received from multicast group members and contain a list of associated groups (group membership information) of the respective multicast group members.

In 905 of FIG. 9, the RAN 120 selects (e.g., a random selection, etc.) one of the plurality of sectors from among the determined sectors of 900. In 910, the RAN 120 initializes a multicast member set for the selected sector. The initialized multicast member set includes, for the selected sector, each target AT or multicast group member belonging to the multicast group associated with the interactive multicast message.

In 915, the RAN 120 may remove all ATs within the multicast member set having an active traffic channel. For example, ATs having a current, active traffic channel (e.g., which is typically known at the RAN 120 as the RAN 120 monitors/supports the traffic channel) will respond over the traffic channel, and as such may be excluded from the ACM. Next, in 920, the RAN selects a given number of target ATs expected to be most likely to respond to the interactive multicast message.

The selecting process 920 may be performed in any number of ways. For example, the RAN 120 may select a set of ATs that have most recently provided location update reports to the RAN 120 (e.g., see discussion of 900 above and FIG. 11 below). In another example, the RAN 120 may perform the selecting process 920 based on a channel quality metric. In this example, the RAN 120 selects one or more ATs based on a current or past measure of the ATs' channel quality on a given channel (e.g., an uplink channel as measured at the RAN 120, a downlink channel as reported from the AT, etc.). However, it will be appreciated that the selecting process 920 may be performed based on any well-known metric, and need not be limited to those disclosed above. Further, the RAN 120 may perform the selecting process 920 based on any combination of metrics included among those listed above and/or those well-known in the art.

In 925 of FIG. 9, the RAN 120 arranges the selected ATs from 920 in a given order to generate the ACM. For example, the given order may be arranged such that the AT expected to be most likely to respond timely to the interactive multicast message is arranged first, followed by the next AT expected to be most likely to respond, and so on. In an example, the ACM may be structured as a control message being addressed to the MATI, similar to the DOS message as discussed above with respect to FIG. 6. In another example, the given order may be designated by the ACM by providing Unicast ATIs (UATIs) within the ACM, with each UATI designating or addressed to one of the selected ATs from 920. Accordingly, the first UATI within the ACM corresponds to the first AT within the given order, the second UATI within the ACM corresponds to the second AT within the given order, and so on. It will be appreciated that, to reduce channel load, less than all of the multicast group members located within a given sector may be designated by the UATIs within the ACM. Accordingly, 925 generates an ACM for the sector selected in 905.

In 930 of FIG. 9, the RAN 120 determines whether an ACM has been generated for each sector determined in 900. If the RAN 120 determines that not all ACMs have yet been generated, the ACM generation process returns to 905 and may repeat the process for a new sector. Otherwise, if the RAN 120 determines that all ACMs have been generated, the process terminates at 935.

Further, while steps 900 through 930 are described above as being "sector" based, these steps may alternatively be performed at a location area (LA) level or multicast area (MA) level (e.g., 900 determines the number of MAs or LAs having at least one target AT, 905 selects one of the determined MAs or LAs, and so on). MAs and LAs are described in greater detail below with respect to FIG. 11.

Returning to the embodiment of FIG. 8, it will be appreciated that FIG. 9 illustrates one example of ACM generation, but the ACM may alternatively be generated in other ways. For example, the ACM may be configured to include an APersistence value without first including an ordered designation of UATIs. For example, as discussed above, the Access Parameters message is typically broadcasted to all ATs and includes an APersistence value used by each respective AT. In an example, the ACM may correspond to an AccessParameter message, which is broadcasted, but In an embodiment of the present invention may be configured to be associated with the multicast message (e.g., addressed to the MATI). Accordingly, the "multicasted" AccessParameter message may determine a temporary APersistence for multicast group responses to the interactive multicast message. Alternatively, the temporary APersistence value may be sent in a Storage BLOB assignment message (e.g., on the downlink control channel). Generally, the APersistence value discussed above is "temporary" in the sense that it is used for responding to the interactive multicast message, and is thereafter "reset" back to the default APersistence value as established by conventional AccessParameter messages. APersistence values are well-known in the art, and will be discussed in greater detail below with respect to 1040 of FIG. 10.

In another alternative ACM example, the ACM need not include the actual APersistence value, but rather may include a given value from which the respective ATs may derive their own temporary APersistence value. Thus, in an example, the ACM may be configured to include a value N indicating the number of ATs within the multicast group. The respective ATs may then use the value N to calculate the temporary APersistence value, as will be described in greater detail below with respect to 1040 of FIG. 10.

Next, the RAN 120 determines whether to apply special handling instructions or treatment to the multicast message in 825. Generally, the determination of 825 is performed as in 615 of FIG. 6, and as such will not be described further for the sake of brevity. If the RAN 120 determines not to apply special handling, the ACM is sent to the multicast group members or ATs along with a BOM, in the next available slot designated for the BOM (e.g., see general discussion of BOM transmission as described with respect to FIG. 4). For the sake of simplicity, the following description relating to ACM handling are described as if the ACM is sent along with a multicast message included within the DOS message on the control channel. However, it will be appreciated that the ACM may alternatively be sent with the BOM with regard to any responsive actions at the AT in response to the ACM described below.

Next, steps 830 and 835 correspond to steps S620 and S625 as discussed above with respect to FIG. 6, and as such a further description thereof has been omitted for the sake of brevity.

In 840 of FIG. 8, the RAN 120 transmits the DOS message including the interactive multicast message and the generated ACMs to each target AT within each sector including more than one target AT or multicast group member. It will be appreciated that the ACM included in the transmission of 840 varies from sector to sector (e.g., or from LA to LA, MA to MA, etc.) based on which ACM corresponds to which sector as determined in the process of FIG. 9 as discussed above. In an example, both the DOS message and the ACM are sent over the downlink control channel in 840 (e.g., in a first MAC layer packet of a next available control channel capsule). In an example, the ACM may be transmitted as a StorageBLOBAssignment message on the downlink.

Next, in 845 of FIG. 8, the target ATs (e.g.AT A, AT B and AT C) receive the DOS message including the interactive multicast message and the ACM on the downlink control channel and extract the interactive multicast message from the DOS message (e.g., as in 635 of FIG. 6).

Figure 10:
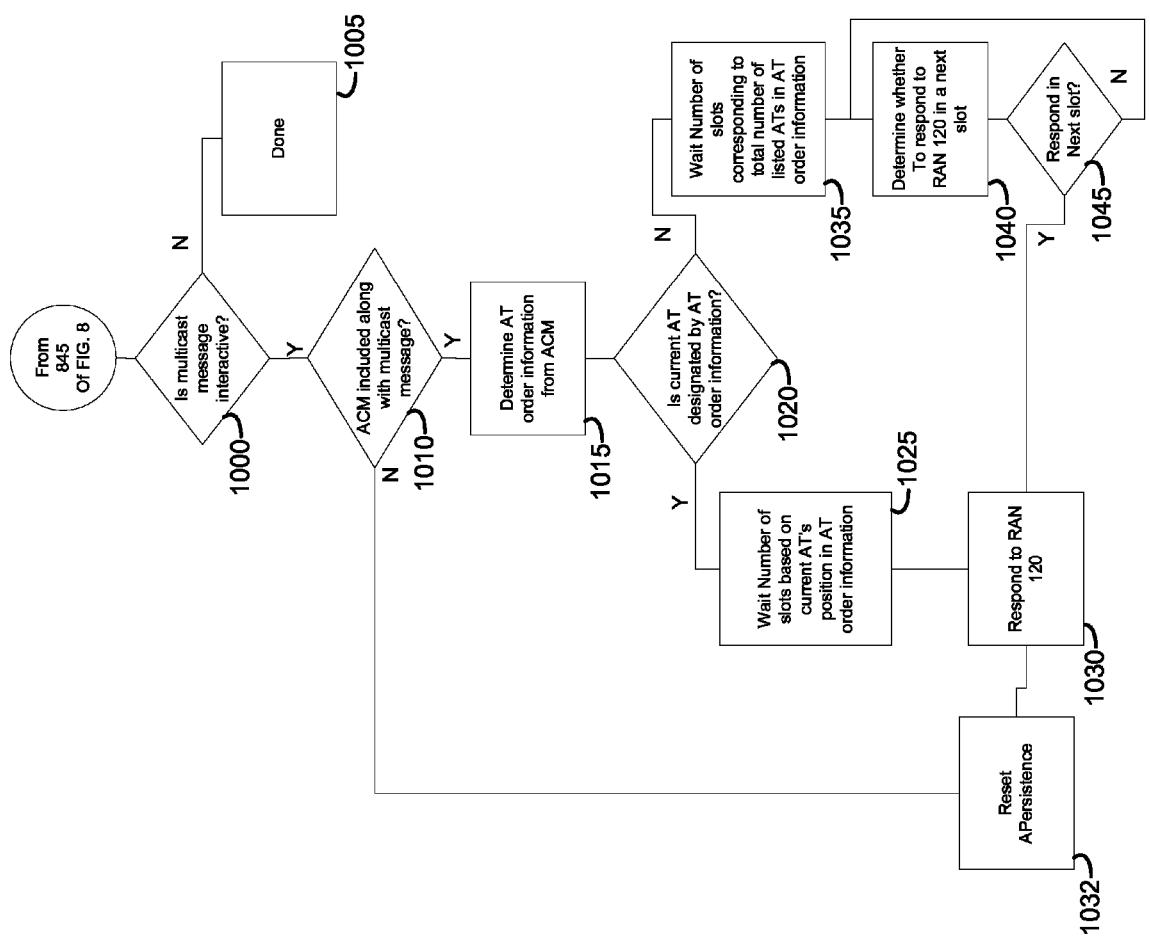
FIG. 10 illustrates an interactive multicast messaging response process according to an embodiment of the present invention.

FIG. 10 illustrates an interactive multicast messaging response process according to an embodiment of the present invention. FIG. 10 is a continuation of FIG. 8, and is representative of a process performed at each target AT within the multicast group subsequent to 845 of FIG. 8.

In the embodiment of FIG. 10, in 1000, a given target AT analyzes the multicast message extracted in 845 of FIG. 8 and determines whether the multicast message is an "interactive" multicast message requiring a response or feedback (e.g., a PTT call which requests a dialogue with one or more group members). If the given target AT determines that the multicast message is not interactive, the process terminates at 1005 and the given target AT need take no further action in support of the multicast message. Otherwise, if the given target AT determines that the multicast message is interactive, the process advances to 1010.

In 1010, the given target AT determines whether an ACM has been received which is associated with the interactive multicast message. If the given target AT determines that no associated ACM has been received, the process advances to 1030 and the given target AT sends a response to the RAN 120 via the uplink access channel without delay. In other words, the given target AT does not wait before responding, but rather responds as soon as possible (e.g., based on a default APersistence value).

Alternatively, in 1010, if the given target AT determines that an associated ACM has been received, the process advances to 1015. In 1015, the given target AT determines the AT order information stored within the associated ACM. The AT order information includes a sequential order or list of ATs, which each target AT may interpret as an order (e.g., a "slot" order) in which the respective target ATs are granted access to the uplink access channel. For example, as discussed above with respect to 925 of FIG. 9, the AT order information may be stored as a sequential list of UATIs addressed to different respective ATs, with the sequence of UATIs corresponding to the AT order information.

In 1020 of FIG. 10, the given target AT determines whether the AT order information designates the given target AT within the sequential list of ATs. An example of this determination will now be provided with respect to Table 1 (below):

TABLE 1

| | ATI Type | First AT | Second AT | Remaining AT(s) |
|---|---|---|---|---|
| ACM Example 1 | MATI: ["01"] | UATI1: ["AT A"] | UATI2: ["AT B"] | APersistence |
| ACM Example 2 | MATI: ["01"] | UATI1: ["AT C"] | UATI2: ["AT A"] | N |

In 1020, if the given target AT determines that the AT order information designates the given target AT within the sequential list of ATs, the process advances to 1025; otherwise, the process advances to 1035. For example, if the given target AT is AT B and the ACM corresponds to ACM Example 1 from Table 1, the 1020 determines that AT B is present within the sequential list of ATs as UATI2. In an alternative example, if the given target AT is AT B and the ACM corresponds to ACM Example 2 from Table 1, the 1020 determines that AT B is not present within the sequential list of ATs.

In 1025, the given target AT waits a number of slots based on the given target ATs position within the AT order information or sequential list of ATs of the ACM. For example, if the given target AT is AT A and the ACM corresponds to ACM Example 1 from Table 1, the given target AT waits zero slots and responds (e.g., on a next or first slot of the uplink access channel) without delay because the AT A is the first listed AT within the sequential list of ATs of the ACM. In an alternative example, if the given target AT is AT A and the ACM corresponds to ACM Example 2 from Table 1, the given target AT waits one slot and responds (e.g., on a next slot of the uplink access channel) only after the delay of one slot because the AT A is the second listed AT within the sequential list of ATs of the ACM (e.g., the first available slot is reserved for another target AT). After waiting in accordance with 1025, the given target AT responds to the RAN 120 in 1030.

In 1035, if the given target AT is not present within the sequential list of ATs of the ACM, the given target AT waits a number of slots based on the total number of ATs listed in the ACM. For example, if three (3) ACMs are listed via three different UATIs in the ACM and the given target AT is not addressed by one of the three different UATIs, the given target AT waits three (3) slots in 1035 (e.g., to allow each of the ATs given access channel priority by the ACM to attempt access before a non-listed or non-priority AT).

Next, in 1040, the given target AT determines whether to respond to the RAN 120 in a next slot (e.g., after the waiting 1035). For example, the given target AT may execute a probabilistic process, or APersistence process, to determine whether to access the uplink access channel in order to respond to the interactive multicast message. APersistence is defined by the 1×EV-DO standard and is typically provided the AccessParameters message. As discussed above with respect to 820 of FIG. 8, the AccessParameters message is broadcasted (e.g., over the broadcast channel BCH) to all ATs, and includes the APersistence value or function to be used by each AT. For example, 0.85 is a commonly used APersistence value. Thus, if a mobile subscriber is attempting to originate a call, the likelihood of call origination for any given slot is 0.85 or 85%. If the call is not made in a first slot, the mobile subscriber tries again with another 85% likelihood in a next slot, and so on. Thus, call origination is likely for each time slot, while the likelihood of perpetual call origination failure (e.g., a 'worst case' scenario) is unlikely because an interfering mobile subscriber will, at some point, not interfere with the mobile subscriber.

However, this "default" form of APersistence may not be sufficient to avoid collisions of concurrent responses from multiple ATs, and as such the ACM may be configured to include an APersistence which is particularly configured to handle concurrent/simultaneous responses, as may be expected in response to an interactive multicast message sent to a relatively large number of ATs. For example, if N is the total number or an estimate of the total number of target ATs within a given cluster (e.g., a physical area that may or may not correspond one or more sectors) or sector (e.g., in the initialized multicast member set of 910 for the given target AT's sector, the number of which may be included along with the AT order information within the ACM), then the given target AT may determine to access the uplink access channel in 1040 with a probability based on N. For example, the probability may be 1/N, 1/(N−X), wherein X is the number of ATs designated within the AT order information of the ACM, etc. Generally, 1040 may attempt to ensure that following the "reserved" slots for the listed ATs within the ACM, on average, a relatively small number (e.g., 1, 2, etc.) of ATs accesses the uplink access channel per slot.

Accordingly, the ACM may instruct ATs to respond to an interactive multicast message either based on (i) a designated order or slot sequence (e.g., based on the UATI order in the ACM) as shown in ACM examples 1 and 2 (ii) an APersistence value based on an estimate N of the total number of ATs within the sector or cluster which may potentially interfere with each other without any associated "deterministic" function or designated order, or (iii) the estimate N from which the respective ATs may calculate their own APersistence value. It will be appreciated that (ii) and (iii) may each be used in conjunction with (i) (e.g., the designated order may be followed by an APersistence function for any non-designated ATs not present in the order). Further, while the process of FIG. 10 is directed to the embodiment wherein (i) is used in conjunction with (ii) or (iii), it will be appreciated that (ii) and (iii) may be used independently of (i). For example, if the designated order includes zero ATs, only the APersistence function may be used to establish interactive multicast message feedback, in accordance with either (ii) or (iii).

In 1045, the given target AT determines whether the probabilistic process results in a determination to access the uplink access channel. If the given target AT does not determine to access the uplink access channel, the process returns to 1040 and repeats for the next slot. Otherwise, if the given target AT determines to access the uplink access channel, the process advances to 1030 and responds to the RAN 120 on the uplink access channel in the designated slot. After 1030, the given target AT "resets" the response protocols indicated by the ACM in 1032 and resumes normal operation in 1010. In other words, once the given target AT returns to 1010, the APersistence value designated in the ACM is no longer used, and rather the given target AT returns to using the APersistence value specified by the broadcasted AccessParameters Message as in the conventional art until a new ACM is received designating a new "temporary" APersistence value.

As discussed above with respect to steps 900 and 920 of FIG. 9, information related to group members of a given multicast group may be based on "group member reports" provided to the RAN 120 by the respective multicast group members. Accordingly, FIG. 11, which will now be described, illustrates a multicast group member reporting process according to an embodiment of the present invention.

In the embodiment of FIG. 11, in 1100, a given AT belonging to one or more multicast groups powers on. After the given AT powers up, the given AT sends group membership information ("group member report") to the RAN 120 in 1105 (e.g., after locating a pilot signal sent by one or more base stations within the RAN 120, and/or performing any other initial power-up procedures). For example, the group membership information provided by the given AT may include a designation of each group to which the given AT wishes to belong. In an example, the group member reports may be included within a standard BCMCSFlowRegistration message, or alternatively may be included within a proprietary or non-standard message, such as a group membership notification (GMN) message encapsulated in a StorageBLOBNotification message on the uplink. For example, the GMN may include a list of multicast IP addresses and port numbers.

In 1110, after reporting the group membership information, the given AT resumes normal operation (e.g., enters idle mode, makes voice calls, etc.). In 1115, the given AT determines whether to update its location information with a supplemental "route update" or report, or alternatively whether to update its group membership information with a supplemental group member report. The determination of 1115 may be performed in any of a number of ways. For example, the determining 1115 may be based on a distance-based registration (DBR) protocol, such that the given AT updates its location information after traversing a given distance (e.g., based on which sector(s) the given AT has traversed, etc.). The given distance may be based on which base stations the given AT has been handed off, which base stations the given AT has been monitoring while in an idle state, etc. In an alternative example, the determination of 1115 may be based on a given period, such that the given AT provides a report to the RAN 120 once for each period. In another alternative example, the given AT may send a location update report (and a group member report) to the RAN 120 each time the given AT enters a new location area (LA), where each LA corresponds to a portion of a subnet or PCF area (e.g., as defined by the RAN 120). In another alternative example, the determining 1115 may be based on whether the given AT wishes to change its group membership information (e.g., the given AT wants to monitor a new multicast group communication, wants to stop monitoring a previously requested multicast group communication, etc.).

If the given AT determines not to update its location information and/or its group membership information in 1115, the process returns to 1110 and the given AT resumes normal operation. Otherwise, in 1120, the given AT sends a supplemental report (e.g., one or more of a location report or a supplemental group membership report) to the RAN 120 before returning to 1110.

While the multicast group members or ATs provide group member reports to the RAN 120, the RAN 120 monitors the reports. The RAN 120 maintains a database including the number of ATs belonging to any particular group, which ATs belong to which group, how recently each group member has provided a location update report, a position (e.g., sector) of each group member, etc. The position of each group member may be stored at the RAN 120 as being within a particular multicast area (MA), where each MA corresponds to a group of contiguous sectors which potentially serve one or more group members (e.g., "potentially" because the location of the group members may not be in the granularity of a sector, because the group members may not respond to an interactive multicast message, etc.). In an example, more than one MA may be identified for a group if group members are geographically dispersed.

While the embodiments of FIGS. 8 through 11 have been described as directed to scheduling responses to interactive multicast messages in conjunction with the earlier described embodiment of FIG. 6, it will be appreciated that the embodiments of FIGS. 8 through 11 need not be so limited. For example, the ACM may be used to schedule interactive multicast message feedback or responses even for "conventional" interactive multicast messages, and need not be limited to examples where the multicast message is sent on the control channel encapsulated within a DOS message. In other words, the scope of the embodiments of the present invention encompasses any type of multicast or broadcast message that receives feedback from the AT. Further, the multicast feedback may be encapsulated in the initial response (e.g., within an access probe) or may be contained in a follow-up message once a traffic channel has been established. However, in either situation, embodiments of the invention will reduce potential collision problems and may increase the probability that the response is received for the ATs having designated or reserved slots (e.g., the ATs "listed" in the ACM).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of scheduling access terminal responses to an interactive multicast message, comprising:
   populating a list of target access terminals, the populated list of target access terminals corresponding to a multicast group for the interactive multicast message;
   selecting less than all of the target access terminals within the populated list of target access terminals, the selected target access terminals including a given number of target access terminals that are expected to have a greater probability to respond to the interactive multicast message than one or more un-selected target access terminals within the populated list of target access terminals;
   determining a sequence of the selected target access terminals; and
   generating an access control message (ACM) indicating the sequence.

2. The method of claim 1, further comprising:
   transmitting the ACM to each of the target access terminals within the populated list of target access terminals; and
   receiving feedback from one or more of the target access terminals within the populated list of target access terminals based on the sequence indicated by the ACM.

3. The method of claim 1, wherein the ACM is transmitted over a downlink control channel, the ACM being addressed to a multicast access terminal identifier (MATI) for the multicast group.

4. The method of claim 1, wherein the populating populates the list of target access terminals based on (i) one or more group member reports received from one or more target access terminals requesting to be associated with one or more multicast messages for the multicast group or (ii) one or more location update reports sent by the at least one of one ore more target access terminals subsequent to the one or more group member reports updating a location of the at least one target access terminal or (iii) any combination thereof.

5. The method of claim 1, wherein the selecting selects a set of target access terminals within the populated list of target access terminals considered to have a greatest probability to respond to the interactive multicast message as the selected target access terminals.

6. The method of claim 5, wherein the set of target access terminals considered to have the greatest probability to respond are based on (i) one or more group member reports received from one or more target access terminals requesting to be associated with one or more multicast messages for the multicast group or (ii) one or more location update reports sent by the at least one of the one or more target access terminals subsequent to the one or more group member reports updating a location of the at least one target access terminal or (iii) any combination thereof.

7. The method of claim 6, wherein the one or more target access terminals and/or the at least one target access terminal having reported (i) or (ii) most recently are selected as the selected target access terminals.

8. The method of claim 1, wherein the determining determines the sequence based on a relative expectation of each of the selected target access terminals to respond to the interactive multicast message.

9. The method of claim 8, wherein the sequence is arranged such that one or more earlier target access terminals in the sequence are expected to have a higher probability of responding to the interactive multicast message relative to one or more later target access terminals in the sequence.

10. The method of claim 1, wherein the generating generates the ACM such that the sequence is indicated by at least one unicast access terminal identifier (UATI) corresponding to one of the selected target access terminals.

11. The method of claim 10, wherein the ACM includes a plurality of UATIs arranged in accordance with the sequence, the plurality of UATIs corresponding to the selected target access terminals.

12. The method of claim 1, wherein the populated list of target access terminals includes each target access terminal for the interactive multicast message within one of a given sector and a given cluster of sectors.

13. The method of claim 1, wherein the ACM instructs the unselected target access terminals from among the populated list of target access terminals to execute an APersistence function.

14. The method of claim 13, wherein the APersistence function is based on one of an APersistence value included in the ACM or a number from which the APersistence value may be derived included in the ACM.

15. An access network, comprising:
  means for populating a list of target access terminals, the populated list of target access terminals corresponding to a multicast group for an interactive multicast message,
  means for selecting less than all of the target access terminals within the populated list of target access terminals, the selected target access terminals including a given number of target access terminals that are expected to have a greater probability to respond to the interactive multicast message than one or more un-selected target access terminals within the populated list of target access terminals;
  means for determining a sequence of the selected target access terminals; and
  means for generating an access control message (ACM) indicating the sequence.

16. The access network of claim 15, further comprising:
  means for transmitting the ACM to each of the target access terminals within the populated list of target access terminals; and
  means for receiving feedback from one or more of the target access terminals within the populated list of target access terminals based on the sequence indicated by the ACM.

17. The access network of claim 15, wherein the means for populating populates the list of target access terminals based on (i) one or more group member reports received from one or more target access terminals requesting to be associated with one or more multicast messages for the multicast group or (ii) one or more location update reports sent by the at least one of the one or more target access terminals subsequent to the one or more group member reports updating a location of the at least one target access terminal or (iii) any combination thereof.

18. The access network of claim 15, wherein the means for selecting selects among the target access terminals of the populated list of target access terminals based on (i) one or more group member reports received from one or more target access terminals requesting to be associated with one or more multicast messages for the multicast group or (ii) one or more location update reports sent by at least one of the one or more target access terminals subsequent to the one or more group member reports updating a location of the at least one target access terminal.

19. The access network of claim 15, wherein the means for determining determines the sequence based on a relative expectation of each of the selected target access terminals to respond to the interactive multicast message.

20. The access network of claim 15, wherein the ACM is generated such that the sequence is indicated by at least one unicast access terminal identifier (UATI) corresponding to one of the selected target access terminals.

21. The access network of claim 15, wherein the populated list of target access terminals includes each target access terminal for the interactive multicast message within one of a given sector and a given cluster of sectors.

22. The access network of claim 15, wherein the ACM is configured to instruct the unselected target access terminals from among the populated list of target access terminals to execute an APersistence function.

23. A non-transitory computer-readable medium including program code stored thereon, comprising:
  program code to populate a list of target access terminals, the populated list of target access terminals corresponding to a multicast group for an interactive multicast message;
  program code to select less than all of the target access terminals within the populated list of target access terminals, the selected target access terminals including a given number of target access terminals that are expected to have a greater probability to respond to the interactive multicast message than one or more un-selected target access terminals within the populated list of target access terminals;
  program code to determine a sequence of the selected target access terminals; and
  program code to generate an access control message (ACM) indicating the sequence.

24. An access network, comprising:
  a processor configured to:
    populate a list of target access terminals, the populated list of target access terminals corresponding to a multicast group for an interactive multicast message,
    select less than all of the target access terminals within the populated list of target access terminals, the selected target access terminals including a given number of access terminals that are expected to have a greater probability to respond to the interactive multicast message than one or more un-selected target access terminals within the populated list of target access terminals;
    determine a sequence of the selected target access terminals; and
    generate an access control message (ACM) indicating the sequence.

* * * * *